United States Patent [19]

Rohrs et al.

[11] 4,138,023

[45] Feb. 6, 1979

[54] VEHICLE WHEELCHAIR LIFT

[75] Inventors: Donald L. Rohrs; Harold A. Downing; Donald L. Collins, all of Hutchinson, Kans.

[73] Assignee: Collins Industries, Inc., Hutchinson, Kans.

[21] Appl. No.: 733,242

[22] Filed: Oct. 18, 1976

[51] Int. Cl.² ............................................. B60P 1/46
[52] U.S. Cl. ............................................. 214/75 R
[58] Field of Search ................ 214/75 R, 75 T, 77 P, 214/95 R

[56] References Cited

U.S. PATENT DOCUMENTS

| 2,497,474 | 2/1950 | Snow | 214/75 T |
|---|---|---|---|
| 2,581,333 | 1/1952 | Vawter | 214/75 T |
| 3,651,965 | 3/1972 | Simonelli et al. | 214/75 T |
| 3,710,962 | 1/1973 | Fowler | 214/75 T |
| 3,776,402 | 12/1973 | Bryan | 214/75 T |
| 3,791,541 | 2/1974 | Himes | 214/75 T |
| 3,795,329 | 3/1974 | Martin et al. | 214/75 T |
| 3,894,014 | 10/1976 | Pohl | 214/75 R |
| 4,015,725 | 4/1977 | Ryan et al. | 214/75 R |

FOREIGN PATENT DOCUMENTS

| 2337453 | 2/1975 | Fed. Rep. of Germany | 214/75 T |
|---|---|---|---|
| 2515713 | 10/1975 | Fed. Rep. of Germany | 214/75 T |

*Primary Examiner*—Francis S. Husar
*Assistant Examiner*—R. B. Johnson
*Attorney, Agent, or Firm*—Edwin H. Crabtree

[57] ABSTRACT

A vehicle wheelchair lift for loading and unloading an occupant confined to a wheelchair. The lift having a wheelchair platform which is folded vertically inside the vehicle and adjacent a vehicle door. When the lift is in use, the vehicle door is opened and the platform is lowered to a horizontal position outside the door opening. The wheelchair occupant is then wheeled onto the lift by a wheelchair attendant and the platform is lowered to the ground surface.

6 Claims, 9 Drawing Figures

VEHICLE WHEELCHAIR LIFT

BACKGROUND OF THE INVENTION

This invention relates generally to lift devices and more particularly, but not by way of limitation, to a vehicle wheelchair lift for raising and lowering a wheelchair occupant.

Heretofore, there have been various types of wheelchair lifts for mounting in a vehicle. The prior art lifts include both electrical and hydraulic operated platforms. The lifts use a combination of cables, gears, and pulleys for raising and lowering the wheelchair platform. These types of systems are complex in design and the mechanical arrangement of the cables, gears, and pulleys require continual maintenance so that the lift is maintained in proper working order. Also, some of the lifts require overhead cross bars which are necessary to provide the mechanical linkage for raising and lowering the wheelchair platform. The cross bars limit the head room on entering and leaving the vehicle.

The subject invention provides a novel wheelchair lift to aid in the transporting of the handicapped.

SUMMARY OF THE INVENTION

The subject invention provides a power system for loading and unloading the wheelchair platform from the vehicle and a separate power system for lowering the platform to the ground surface.

The wheelchair lift is fully automatic and provides an electrically operated feed screw for raising and lowering the wheelchair platform from a vertical position inside the vehicle to a horizontal position outside the vehicle and adjacent the door opening. When the wheelchair platform reaches a horizontal position adjacent the door opening of the vehicle, the screw is automatically released from the platform and the platform is lowered horizontally to the ground surface by a pair of hydraulic cylinders.

The subject invention is rugged in construction and simple in design and eliminates the use of cables, gears, and pulleys used in raising and lowering the wheelchair platform.

The wheelchair lift provides a novel cam linkage which automatically pivots the hydraulic cylinders attached to the wheelchair platform outwardly so that as the platform is lowered it clears the sides of the vehicle below the door opening.

The invention has a pair of hydraulic cylinders pivotly mounted in hydraulic cylinder housings which are attached to the top of a pair of stancion tubes disposed on each side of the door opening of the vehicle. The lift has no cross bars connecting the hydraulic cylinders so that the head room is not limited when entering and leaving the door opening of the vehicle.

The vehicle wheelchair lift is readily adaptable to any make of vehicle and includes an electric power supply system which may be powered by the vehicle's battery.

The vehicle wheelchair lift includes a pair of stanchion tubes disposed on each side of the door opening. The lower portion of the tubes is attached to the floor of the vehicle. A pair of hydraulic cylinders, mounted inside hydraulic cylinder housings, are pivotly attached to the top of the stanchion tubes. A pair of telescoping channels are slidably mounted inside the hydraulic cylinder housings. The telescoping channels are attached to a lateral base channel which is horizontally mounted. The lateral base channel supports a pivotly attached wheelchair platform. An electric screw is pivotly attached to one of the hydraulic cylinder housings. The electric screw is releasably engaged to the wheelchair platform for raising and lowering the platform from the vehicle. The telescoping channels with the lateral base channel attached thereto raise and lower the wheelchair platform horizontally from the level of the vehicle floor to the ground surface.

The advantages and objects of the invention will become evident from the following detailed description when read in conjunction with the accompanying drawings which illustrate the preferred embodiments of the invention.

BRIEF DESCRIPTION OF THE DRAWINGS

FIG. 5 is a side view of the wheelchair lift with the wheelchair platform lowered to a horizontal position and adjacent the floor of the vehicle.

DETAILED DESCRIPTION OF THE DRAWINGS

Figure 1:
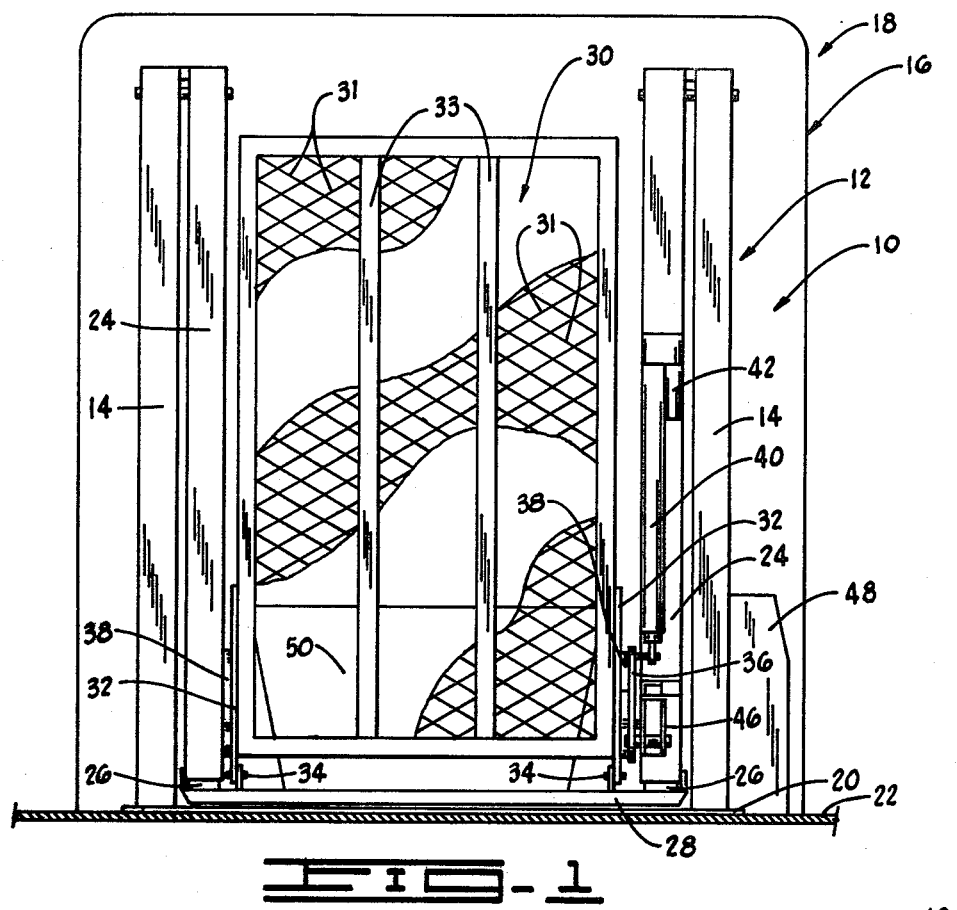
FIG. 1 is a front view of the wheelchair lift vertically disposed inside a door opening in the vehicle.

In FIG. 1, the wheelchair lift is designated by general reference numeral 10. The lift 10 includes a frame 12 made up of a pair of stanchion tubes 14 vertically mounted and disposed on both sides of a door opening 16 of a vehicle 18. The stanchion tubes 14 are attached at the bottom to a base plate 20 which is secured to a floor 22 of the vehicle 18.

Hydraulic cylinders, which are not shown, are enclosed in hydraulic cylinder housings 24. The housings 24 are pivotly attached to the top of the stanchion tubes 14. Telescoping channels 26 are slidably mounted in the housings 24 and attached to the ends of the hydraulic cylinders. The ends of the telescoping channels 26 are attached to a horizontal lateral base channel 28.

A wheelchair platform 30 is shown disposed in a vertical position in FIG. 1. The platform 30 is made of a non-slip metal mesh material 31 supported on metal braces 33. Hinge plates 32 are mounted along the sides of the platform 30 and are pivotly attached to the lateral base channel 28 by hinges 34. One of the hinge plates 30 includes outwardly extending pins which are shown in detail in FIGS. 7 through 9. The pins attached to the hinge plates 32 releasably engage a fold up cam 36 and a platform cam 38.

Figure 4:
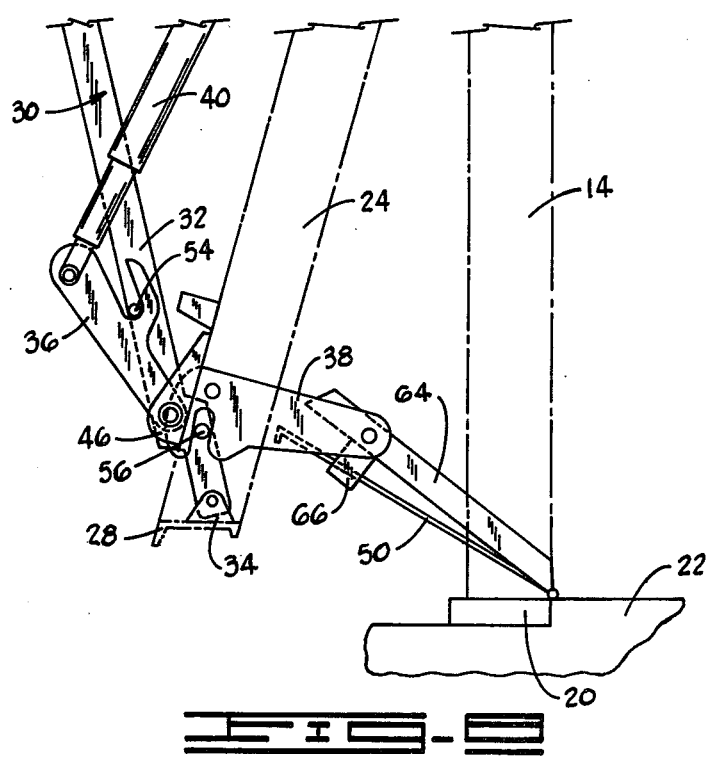
FIG. 4 is a side view of the wheelchair lift with the wheelchair platform in a vertical position inside the door opening in the vehicle.

One end of the fold up cam 36 is pivotly attached to the end of an electrically driven screw 40. The screw 40 is driven by a motor in a screw housing 42. The screw 40 and housing 42 are pivotly attached to one of the cylinder housings 24 by a hinge 44. The hinge 44 is shown in FIG. 4. The other end of the fold up cam 36 is pivotly mounted to the cylinder housings 24 by a hinge 46.

The hydraulic cylinders in the housings 24 and the electric screw 40 are operated by a power supply pack 48 containing a hydraulic pump, motor, electrical switches, and wiring. The power supply pack 48 is connected to the battery of the vehicle 18.

A bridge plate 50 is hinged at one end of the base plate 20 and pivotly attached at the other end to the platform cam 38. The plate 50, shown in FIG. 1, is disposed in a vertical position. When the platform 30 is lowered, the plate 50 in turn is lowered, thereby providing a bridge between the floor 22 of the vehicle 18 and the platform 30 for receiving the wheelchair thereon.

Figure 2:
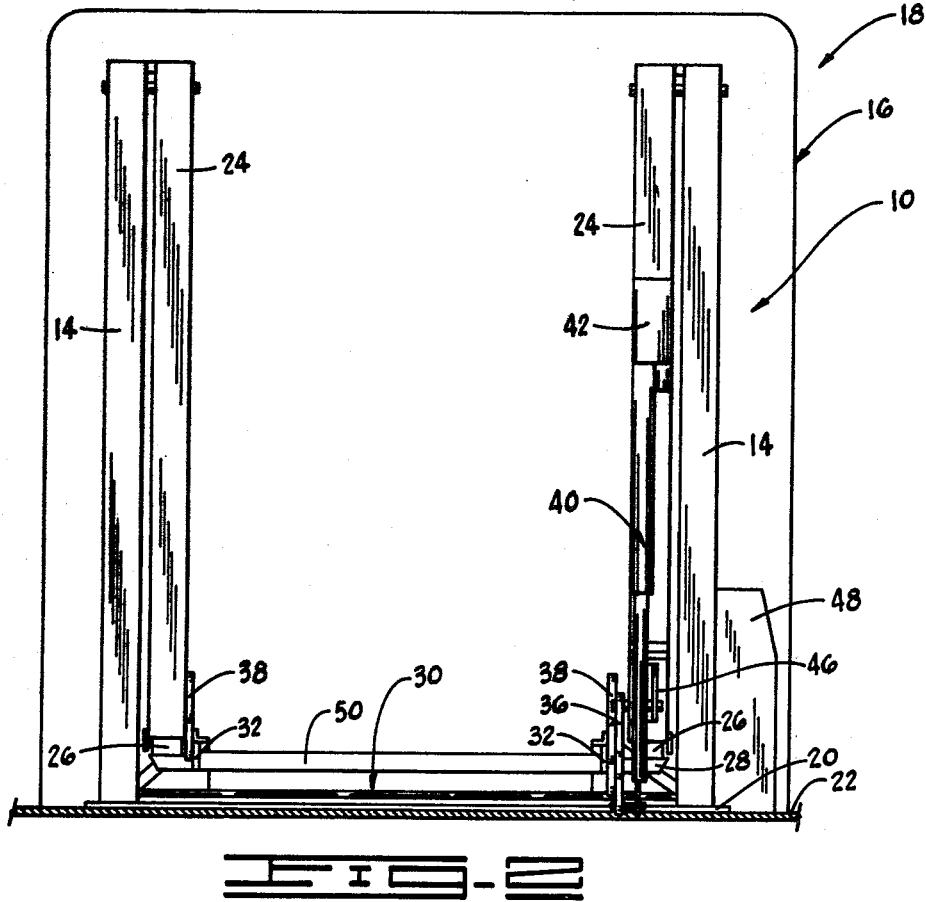
FIG. 2 is a front view of the wheelchair lift with the wheelchair platform lowered horizontally for receiving the wheelchair from the vehicle.

In FIG. 2, the wheelchair lift 10 is illustrated with the platform 30 lowered by the screw 40 to a horizontal position adjacent the floor 22 of the vehicle 18. In this position, the wheelchair occupant is ready for being loaded onto the platform 30 from the vehicle 18.

Figure 3:
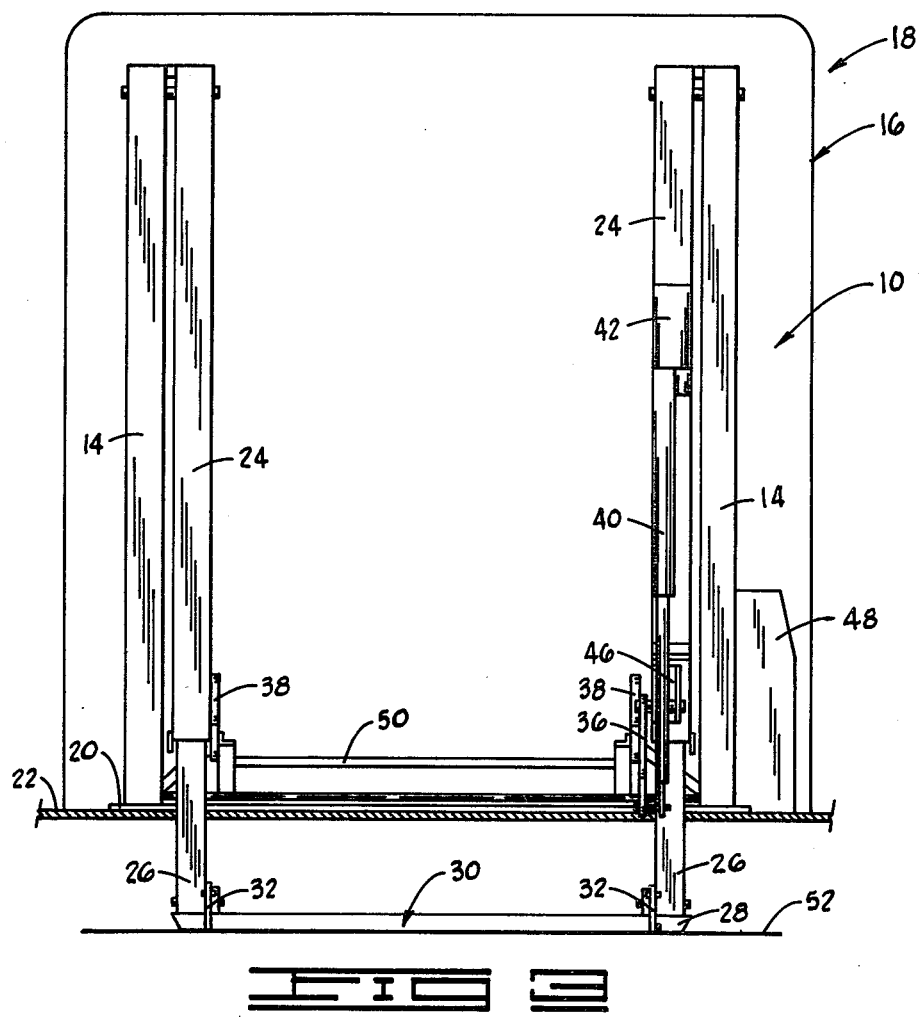
FIG. 3 is a front view of the wheelchair lift with the wheelchair platform lowered horizontally to the ground surface.

In FIG. 3, the wheelchair occupant who has been loaded onto the platform 30 has now been lowered to a ground surface 52. The platform 30 is lowered to the ground surface 52 by the telescoping channels 26 which are hydraulically operated by the hydraulic cylinders in the hydraulic cylinder housings 24.

In FIG. 4, a side view of the lift frame 12 is illustrated showing the platform 30 in a vertical position inside the vehicle 8. This view illustrates the platform 30 in the same position as shown in FIG. 1. In this view, the compactness of the lift 10 is seen wherein the housings 24 fold inwardly adjacent the stachion tubes 14 with the platform 30 therebetween. The screw 40 is substantially parallel to the housings 24 with the lower portion of the screw 40 pivoting outwardly as the screw 40 rotates the fold up cam 36 counter clockwise when lowering the platform 30.

In FIG. 5, a side view of the lift 10 is illustrated showing the lift 10 in a similar position as shown in FIG. 2. In this view, the platform 30 can be seen horizontally positioned and adjacent the floor 22 of the vehicle 18 with the bridge plate 50 lowered.

It should be noted that as the screw 40 lowers the platform 30, the pivotly attached fold up cam 36 and platform cam 38 which are pivotly attached to the hydraulic cylinder housings 24 pivot the lower end of the cylinder housings 24 outwardly thereby providing clearance between the platform 30 and the sides of the vehicle 18.

Figure 6:
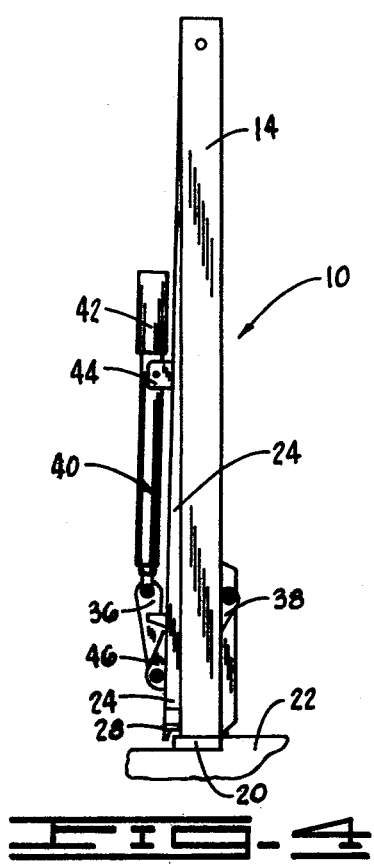
FIG. 6 is a side view of the wheelchair lift with the wheelchair platform lowered to the ground surface.

FIG. 6 is a side view of the lift 10 as illustrated in FIG. 3. In this view, the hinge plates 32 attached to the sides of the platform 30 have been released from the fold up cam 36 attached to the screw 40. The hydraulic cylinders in the hydraulic cylinder housings 24 have been activated and the telescoping channels 26 attached to the lateral base channel 28 have in turn lowered the platform 30 to the ground surface 52.

Figure 7:
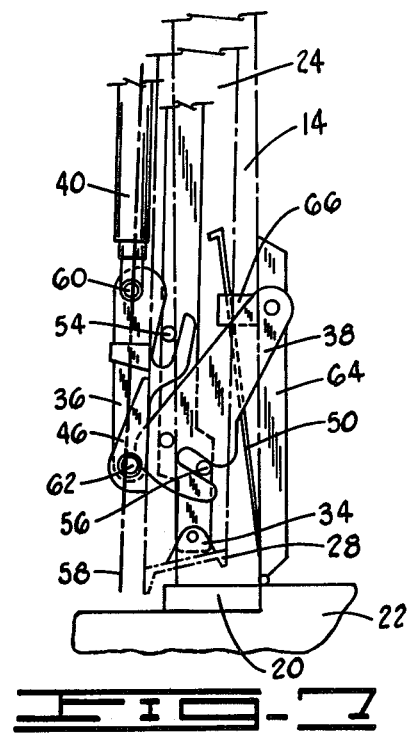
FIG. 7 is a partial side view showing a detailed illustration of the cam arrangement with the wheelchair platform in a vertical position.

In FIG. 7, an enlarged view of the fold up cam 36 and the platform cam 38 is illustrated. In this view, the cams 36 and 38 can be seen releasably engaging a fold up pin 54 and a bridge pin 56 which are attached to and extend outwardly from the hinge plate 32.

In this figure, a line 58 is drawn through the length of the electric screw 40 and connecting pin 60. The line 58 is offset from the center of a connecting pin 62 which connects the cam 36 to the hinge 46. By offsetting the attachment of the screw 40 with the fold up cam 36, the screw 40 pivots the fold up cam 36 outwardly. At this time, the fold up cam 36 engages pin 54 thereby unfolding the platform 30 outwardly and downwardly from the vehicle 18. As the platform 30 moves outwardly, the pin 56 engages the platform cam 38 which is pivotly attached to a bridge bracket 64 which includes a hanger 66 for lowering the bridge plate 50.

Figure 8:
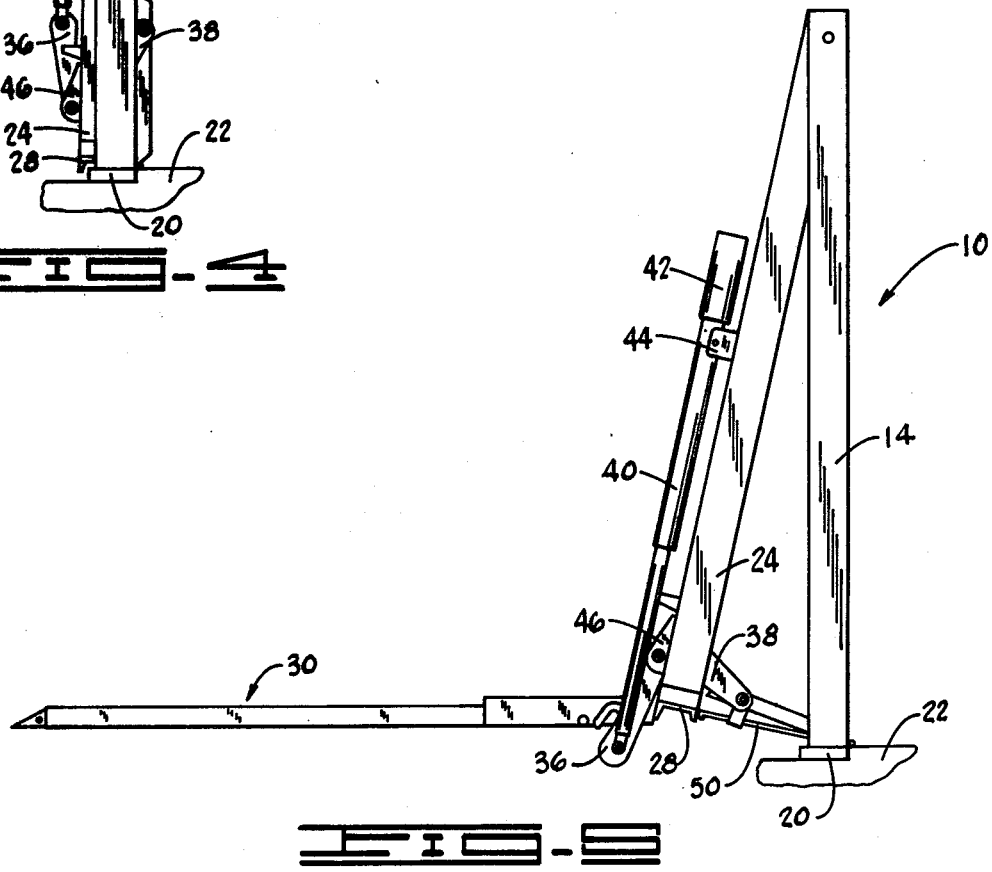
FIG. 8 is a partial side view showing a detailed illustration of the cam arrangement with the wheelchair platform in a partially lowered position.

In FIG. 8, the platform 30 has been partially lowered and the cams 36 and 38 are still engaged to pins 54 and 56. In this view, it can be seen by the combination of the pivoting of the cams 36 and 38, the cylinder housings 24 are urged outwardly from the vertically mounted stanchion tubes 14.

Figure 9:
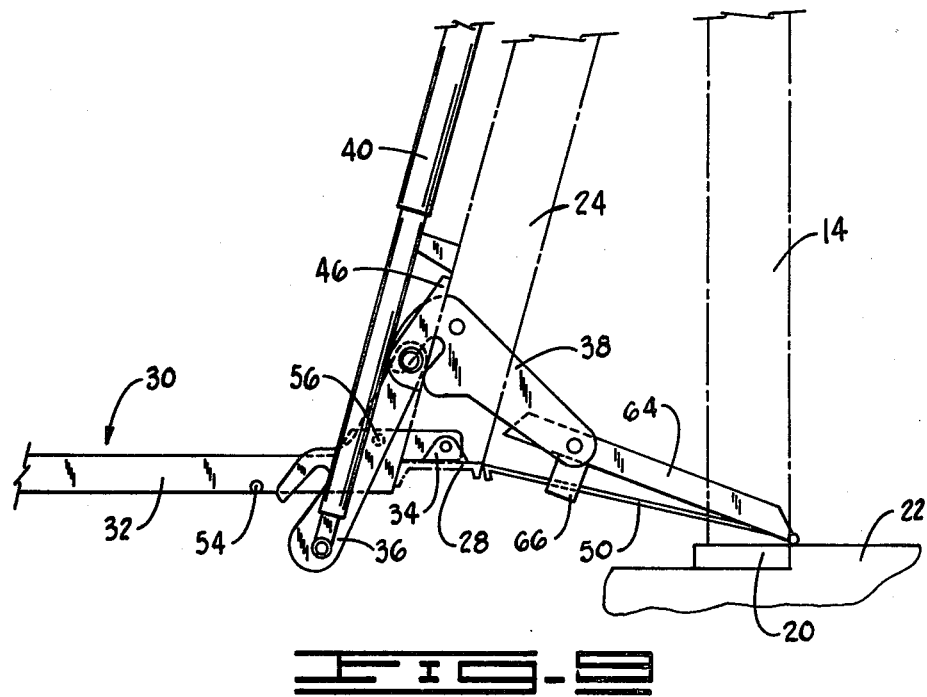
FIG. 9 is a partial side view showing a detailed illustration of the cam arrangement with the wheelchair platform lowered to a horizontal position adjacent the floor of the vehicle.
Figure 8:
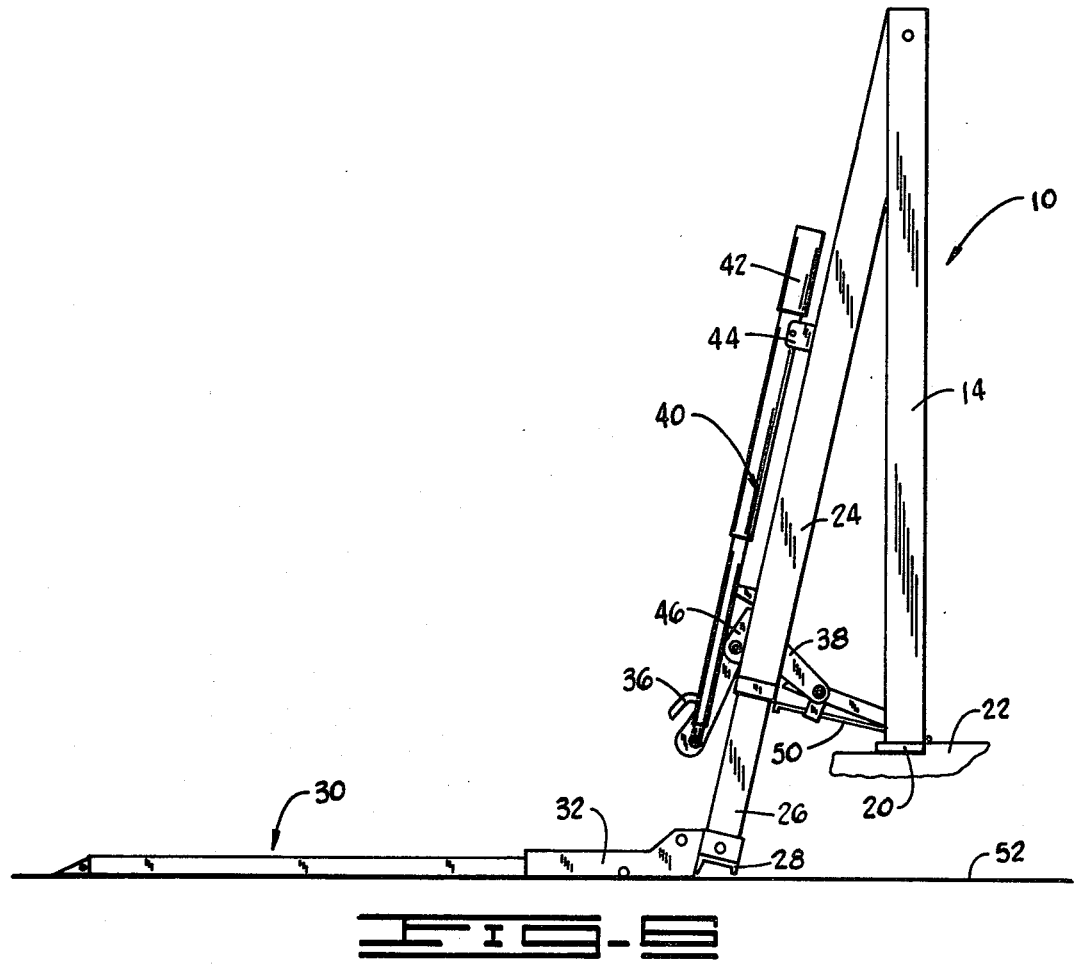

In FIG. 9, the platform 30 has been lowered to a horizontal position by the screw 40 and the pins 54 and 56 are disengaged from the cams 36 and 38. Also, the bridge plate 50 has been lowered to a position adjacent the length of the lateral base channel 28. The platform 30 is now in position for being lowered to the ground surface 52 by the telescoping channels 26.

When it is desired to retract the platform 30 into the vehicle 18, the platform 30 is raised to a horizontal position adjacent the floor 22 of the vehicle. The wheelchair occupant is wheeled into the vehicle across the lateral base channel 28, the bridge plate 50, and onto the vehicle floor 22. The screw 40 is then fed upwardly. As the screw 40 raises, the cams 36 and 38 engage the pins 54 and 56. The cam 36 folds the platform 30 upwardly and inwardly into the vehicle 18. At the same time, the platform cam 38, via the bridge bracket 64, raises the bridge plate 50 upwardly. When the screw 40 has completed its travel upwardly, the platform 30 and hydraulic cylinder housings 24 are retracted into a vertical position inside the vehicle 18.

Changes may be made in the construction and arrangement of the parts or elements of the embodiments as disclosed herein without departing from the spirit or scope of the invention as defined in the following claims.

I claim:

1. In a vehicle having a door opening and a floor, a lift for loading and unloading said vehicle, said lift comprising:

a pair of stanchion tubes disposed on each side of the opening of the vehicle, means attaching the lower portion of said tubes to said floor;

a pair of hydraulic cylinder housings, means pivotally attaching the top of said housings to the top of said stanchion tubes;

hydraulic cylinder means mounted inside each of said hydraulic cylinder housings;

telescoping channel means slidably mounted in said hydraulic cylinder housings and attached to the ends of said hydraulic cylinder means;

a horizontally disposed base channel, said channel attached to the ends of said telescoping channel means;

a platform having one end pivotally attached to said channel;

pivot means attached to one of said hydraulic cylinder housings for selectively engaging, pivoting and releasing said platform and to pivot said platform between a vertical and a horizontal position;

means attached to one of said hydraulic cylinder housings and said pivot means to actuate said pivot means; and means on said platform engageable by said pivot means when said platform is in a predetermined position.

2. The lift as described in claim 1 wherein said means attached to one of said hydraulic cylinder housings and said pivot means is an electrically operated screw.

3. The lift as described in claim 2 wherein said pivot means attached to one of said hydraulic cylinder housings is a fold-up cam.

4. The lift as described in claim 3 wherein said means on said platform engageable by said pivot means is a fold-up pin mounted on the side of said platform, said fold-up cam engaging said fold-up pin and lowering said platform outwardly from a vertical position in the opening of the vehicle to a horizontal position for loading thereon, said fold-up cam releasing said fold-up pin when said platform is in a horizontal position thereby allowing said hydraulic cylinder means to lower said platform downwardly to the ground surface below the vehicle.

5. The lift as described in claim 3 further including a platform cam pivotally attached to one of said hydraulic cylinder housings and a bridge plate, said bridge plate hingedly attached to the floor of the vehicle, said platform cam releasably engaging a bridge pin mounted on the side of said platform, said platform cam co-acting with said fold-up cam to pivot said hydraulic cylinder housings outwardly from the vehicle and lowering said bridge plate.

6. In a vehicle having a door opening and a floor, a lift for loading and unloading said vehicle, said lift comprising:

a pair of stanchion tubes disposed on each side of the opening in the vehicle, means attaching the lower portion of said tubes to the floor of the vehicle;

a pair of hydraulic cylinder housings, means pivotally attaching the top of said housings to the top of said stanchion tubes;

hydraulic cylinder means mounted inside each of said hydraulic cylinder housings;

telescoping channel means mounted in said hydraulic cylinder housings and attached to the ends of said hydraulic cylinder means;

a horizontally disposed base channel, said channel attached to the ends of said telescoping channel means;

a platform having one end pivotally attached to said channel;

a fold-up cam attached to one of said hydraulic cylinder housings, said fold-up cam selectively engaging, pivoting and releasing said platform for pivoting said platform between a vertical and horizontal position;

an electrically operated screw pivotally attached to one of said hydraulic cylinder housings and to said fold-up cam, said screw pivoting said fold-up cam for engaging, pivoting and releasing said platform; and a fold-up pin mounted on the side of said platform, when said screw is actuated said fold-up cam engaging said fold-up pin and lowering said platform outwardly from a vertical position in the opening of the vehicle to a horizontal position for loading thereon, said fold-up cam releasing said fold-up pin when said platform is in a horizontal position thereby allowing said hydraulic cylinder means to lower said platform downwardly to the ground surface below the vehicle.

* * * * *